United States Patent Office 3,446,685
Patented May 27, 1969

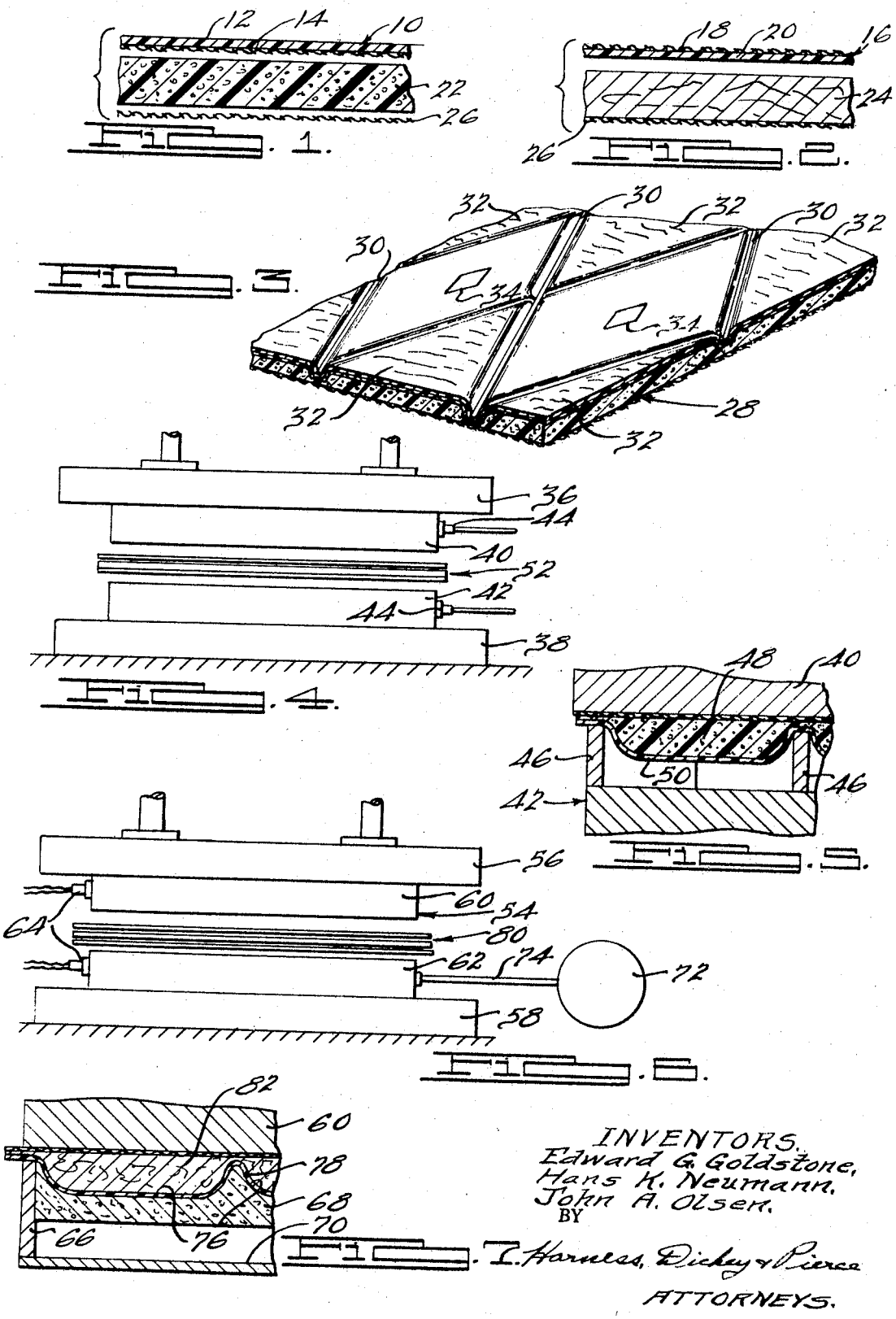

3,446,685
TRIM PANEL AND METHOD OF
MAKING SAME
Edward G. Goldstone, Huntington Woods, Hans K. Neumann, Detroit, and John A. Olsen, Grosse Point Woods, Mich., assignors to Allen Industries, Inc., Detroit, Mich., a corporation of Delaware
Filed Aug. 13, 1965, Ser. No. 479,378
Int. Cl. B32b 31/12
U.S. Cl. 156—219                                    4 Claims

ABSTRACT OF THE DISCLOSURE

A method for forming a composite decorative trim material consisting of a resilient pad and a decorative face sheet adhesively bonded thereto over substantially the entire surface thereof. The panel is provided with a preselected shape-retaining contour achieved by the combination of internal vapor pressure and external suction and a preselected texturing of the exterior surface of the face sheet is simultaneously accomplished in the contouring and bonding operation.

The present invention broadly relates to the method of making composite cushioning materials and, more particularly, to a novel decorative trim panel and method of making same, including a thermoplastic face sheet securely adhered to an underlying padding material which is embossed in localized areas to provide a preselected decorative contoured surface appearance.

Composite cushioning materials of the type to which the present invention is applicable are in widespread commercial use in the manufacture of home furnishings, automotive interior trim, or the like. Such trim panels are particularly applicable to interior automotive trim including the seat and seat back portions as well as the decorative finishes for the inside door panels. Conventionally, composite trim materials employed for the foregoing purposes include a decorative wear-resistant and abrasion-resistant facing sheet which is applied over an underlying resilient padding material, enhancing the feel and cushioning characteristics of the surfaces to which it is applied. It has been customary in the past to enhance the decorative characteristics of such trim materials by including localized depressed areas therein, forming a selected quilted or embossed pattern thereon. Various techniques have heretofore been used or proposed for use to effect such a quilting of composite trim materials, including stitching the facing sheet and pad material together along selected areas, forming localized depressions therein. Alternatively, various dielectric heat-fusion techniques have been employed for imparting a preselected quilted pattern to composite trim materials of this type.

Of the various techniques heretofore used or proposed for use, each is subject to several inherent disadvantages, either in high cost or time-consuming operations required for imparting such a quilted pattern or, alternatively, in the lack of flexibility in selection of the various designs which can be incorporated in such trim panels. For example, the stitching of a facing sheet and pad material to each other is an extremely costly and time-consuming operation, and the resultant composite material formed is characterized as allowing relative movement between the facing sheet and underlying padding material in those areas devoid of any stitching which usually results in a wrinkling and excessive wear rate of the composite material.

There has been a heretofore long-felt unfilled need for a method of making decorative composite trim materials of a quilted surface, which additionally includes selected localized embossments of the surface of the facing sheet, further enhancing the aesthetic appearance thereof. Heretofore, such localized surface embossments could only be achieved by preliminarily forming a facing sheet having selected variations in its surface texture and thereafter placing said facing sheet in exact registry prior to a sewing or dielectric bonding operation. These techniques result in a multitude of individual operations, which further detracts from the economy of the composite material produced.

It is accordingly a principal object of the present invention to provide an improved trim panel and method of making same which overcomes the problems and disadvantages associated with the trim panels and techniques for making the trim panels heretofore known.

Another object of the present invention is to provide a novel method for making resilient composite decorative trim materials which incorporate any desired pattern of localized depressed sections and may be additionally provided with selected variations in the embossed surface texture of the facing sheet.

Still another object of the present invention is to provide an improved method for making composite decorative trim materials which include a facing sheet and padding material that are tenaciously bonded to each other over substantially the entire surface area therebetween, avoiding relative shifting of the materials and retaining the sharp definition of the design imbedded thereon throughout its long useful life.

Yet still another object of the present invention is to provide a novel method for making resilient composite trim materials which is simpler, more economical, of greater flexibility and versatility, and results in an article of increased durability and aesthetic appearance than methods and trim materials of similar type heretofore known.

The foregoing and other objects and advantages of the present invention are achieved by applying a heat-reactable thermosetting adhesive between the opposed faces of a thermoplastic facing sheet and a resilient permeable padding material which incorporates a controlled quantity of water on at least one surface thereof, and thereafter placing the facing sheet and pad in superimposed relationship between the platens of a heated die assembly, with the facing sheet disposed in contact with a die having a preselected contour. The die is thereafter closed, effecting concurrent heating and localized compression of the assembly and conversion of the water in the pad to steam which permeates the pad material and exerts pressure against the noncompressed portions of the facing sheet, imparting a smooth surface contour between the depressed and uncompressed portions thereof while simultaneously effecting a curing of the heat-reactable adhesive. The resultant assembly, after at least a partial curing of the adhesive, is thereafter removed from the die. In accordance with an alternative embodiment comprising the present invention, the contoured die of the die assembly against which the thermoplastic facing sheet is disposed may be subject to a vacuum during the molding operation, such that selected portions of the facing sheet are simultaneously provided with a surface texturing, further enhancing the decorative appearance of the composite finished trim material.

The foregoing and other objects and advantages of the present invention will become apparent upon a reading of the following specification, taken in conjunction with the drawings in which:

FIGURE 1 is a fragmentary magnified vertical sectional view of a resilient pad positioned between a fabric-backed thermoplastic facing sheet and an open-mesh reinforcing fabric prior to the molding operation;

FIG. 2 is a fragmentary magnified vertical sectional view of a resilient pad incorporating a reinforcing fabric on the lower surface thereof and a woven fabric facing sheet incorporating a substantially impermeable liner material secured to the inner face thereof:

FIG. 3 is a fragmentary perspective view of a typical trim panel made in accordance with the practice of the present invention and illustrating an exemplary diamond-shaped quilted pattern therein, including selected surface texturing of certain areas thereof;

FIG. 4 is a diagrammatic side elevation view of a typical die assembly employed for molding the several sheets together, forming an integral trim panel;

FIG. 5 is an enlarged fragmentary vertical sectional view of a composite trim material while under compression in a mold of the type shown in FIG. 4;

FIG. 6 is a diagrammatic side elevational view of a die assembly in accordance with an alternative embodiment of the present invention, wherein the contoured die surface is provided with a vacuum system for assisting the contouring of the trim materials, and FIG. 7 is an enlarged fragmentary vertical sectional view of a composite trim material being formed in accordance with the die assembly shown in FIG. 6.

In accordance with the practice of the present invention, the composite trim material consists of a facing sheet and a resilient pad to which the facing sheet is adhesively secured over substantially the entire surface area therebetween. The facing sheet may comprise any suitable thermoplastic film, as well as woven or knitted fabrics which are rendered substantially nonpermeable by the application of a barrier layer or tie coat to the inner surface thereof. Thermoplastic films suitable for the facing sheet include vinyl, expanded vinyl, acrylonitrile butadiene styrene (ABS), polyolefin resins such as, for example, polyethylene and polypropylene, or the like. Of the foregoing materials, vinyl films and expanded vinyl films are preferred, since they most closely simulate the feel or "hand" and appearance of natural leather. The thermoplastic films may be nonsupported, but preferably include a suitable reinforcement such as a knitted fabric affixed to or imbedded in the inner surface thereof. A reinforced or supported vinyl facing sheet as indicated at 10 in FIG. 1 of the drawings. When using nonsupported thermoplastic films, it is necessary in some instances (depending on the heat-retractable adhesive formulation employed) to apply a suitable tie coat to the inner surface of the facing sheet to enhance its adherence to the adhesive coating and to the underlying padding material.

Any one of a variety of suitable prime or tie coats can be employed for this purpose which are compatible with the thermoplastic film material as well as the adhesive formulation employed for forming the composite material. Typical of tie coat formulations are acrylic latices, styrene latices, styrene-butadiene latices, zein, or the like. Particularly satisfactory results have been obtained employing acrylic latices in the form of aqueous suspensions incorporating therein a wetting or emulsifying agent effecting good wetting characteristics of the fibers to which the solution is applied. Tie coat compositions comprising Rhoplex B 15 available from Rohm & Haas in combination with about 0.3% of a wetting agent such as Triton GR5 comprising alkylaryl polyester alcohols, sulfonates, and sulfates, also available from Rohm & Haas Company or, alternatively, a blend of Rhoplex E32 in combination with 1% of a 10% aqueous solution of oxalic acid and 0.2% by weight of Triton X100 have provided satisfactory performance for this purpose.

In accordance with the preferred practice of the present invention, the facing sheet consists of a supported vinyl film preferably employing an open-mesh fabric or nonwoven fabric, such a Chemo-Textile Pellon or similar materials which possess stretchability characteristics to permit elongation of the facing sheet during the molding operation, enhancing the depth of the profile of the "puff" or quilt applied to the composite material. Supported vinyl facing sheets are commercially available with a cotton knitted backing imbedded on the inner surface thereof, which have been found particularly satisfactory in accordance with the practice of the present invention. This latter construction corresponds to that of the facing sheet 10 shown in FIG. 1 including a vinyl film 12 having a knitted fabric backing 14 on the inner surface thereof.

It is also contemplated that a facing sheet 16, as illustrated in FIG. 2, can be satisfactorily employed consisting of a decorative fabric 18 having a suitable barrier layer 20 secured or otherwise affixed to the inner surface thereof. For this purpose, the decorative fabric may consist of threads which are either natural or synthetic, and which is preferably knitted so as to provide stretchability characteristics at least in one direction of the cloth. The use of the barrier layer 20 serves not only as a tie or prime coat to enhance the adhesive bonding of the face sheet 16 to the underlying pad material, but also serves to decrease the porosity of the fabric, achieving thereby an increased depth in the profile of the puffs or quilting by virtue of the retention of the pressure applied to the inner surface thereof by the steam generated during the molding operation.

It is also contemplated that the barrier layer 20 may comprise a thin film of a suitable thermoplastic and flexible resin material of the same types as disclosed in connection with face sheet 10 which similarly is adhesively secured or imbedded in the threads along the inner surface of the fabric 18. The barrier layer can also consist of a substantially impervious thin layer of polyurethane, vinyl or other synthetic foam adhered, laminated or otherwise attached to the rear face of the fabric. It has been found that decorative fabrics which are of a relatively open weave and which are devoid of any barrier coating such as the coating 20 illustrated in FIG. 2 do not permit the attainment of the depth of profile in comparison to that achieved by the composite facing sheet 16. It will be noted in FIG. 2 that the thickness of the barrier layer 20 is exaggerated for the purposes of clarity, and can be varied, depending on the intended end use of the trim panel, within any preselected range of thicknesses. The barrier layer 20 can suitably be applied to the inner surface of the decorative fabric 18 either by roller knife or spray coating techniques or, alternatively, by directly laminating a thin synthetic film on thin layer of polyurethane foam to the fabric with or without the use of an intervening adhesive layer. The barrier layer 20 preferably is selected so as to provide good compatibility and adherence with the adhesive employed for securing the facing sheet to the pad, avoiding thereby the necessity of using a suitable prime or tie coat to enhance the adhesive characteristics thereof.

The pad employed in forming the resilient decorative trim panel may comprise a cellular foam material such as the pad 22 illustrated in FIG. 1, or may be of a fibrous structure such as the fibrous pad 24 illustrated in FIG. 2. Foam pads 22 may consist of any suitable cellular material, including latex foams made of natural and/or synthetic rubbers, vinyl foams, polyurethane foams, or the like, of which low-density polyurethane foam pads are preferred. Typical of the fibrous pad 24 are soft resilient pads made of jute, garnetted cotton batting, or the like. In any event, the pad material is characterized (whether it be of a cellular or fibrous construction) as being porous to an extent to permit permeation thereof by steam generated during the molding operation as well as migration of the adhesive applied to one or both faces of the pad through to the interior of the localized compressed portions thereof.

In accordance with the novel process comprising the present invention, the steam generated during the molding operation (which may be further supplemented by the application of a vacuum to the interior face of the facing sheet) provides a relatively deep puff or profile which is retained upon subsequent cooling of the molded assembly and does not rely on the pressure exerted by the resilient pad material for shape retention. Accordingly, pad materials of a comparatively low density can be satisfactorily employed for forming the composite trim material which, in combination with the flexibility of the face sheet employed, provide a hand or feel of the panel which is unobtainable in accordance with the techniques heretofore employed wherein relatively dense pad materials are employed in order to exert sufficient pressure to maintain a relatively shallow puff of the embossed panel.

In accordance with the preferred practice of the present invention, a layer of reinforcing material or sheeting, indicated at 26 in FIGS. 1 and 2, is adhered or otherwise affixed to the opposite surface of the intervening pad material. For this purpose, the sheeting 26 or scrim may comprise any woven or knitted fabric, either of natural or synthetic yarns. The sheeting 26 is preferably adhesively secured to the surface of the pad material employing a suitable compatible adhesive which may conventionally be applied by means of well-known spray or roller coating techniques. The attachment and adherence of the sheeting 26 may be achieved simultaneously with the attachment, molding and adherence of the face sheet, in which event the same heat-reactable adhesive can be employed. Alternatively, the sheeting 26 as illustrated in FIG. 2 can be preliminarily secured to one side of the pad 24 prior to the molding operation, in which event greater latitude is provided in the selection of the adhesive formulation.

While the use of a reinforcement such as the sheeting 26 is not critical according to the practice of the present invention, the inclusion of the sheeting serves to provide increased dimensional stability of the composite trim panel, and further serves to reinforce and retain the profile of the puff or quilting applied to the panel during the molding operation. The use of the sheeting 26 is necessary in most instances wherein the resultant trim panel is to be employed as an insert such as, for example, in automotive seats in which the insert is conventionally sewn to the adjoining body cloth. In such event, the reinforcement provided by the seating 26 and the backing 14 on the supported vinyl facing sheet 10, as illustrated in FIG. 1, is effective to prevent tear-through of the stitching along the edges of the insert.

The adherence of the several sheet-like components into an integral trim panel assembly can be achieved by employing any heat-reactable or thermosetting adhesive which is compatible with the materials of which the pad and facing sheet are comprised and which preferably, upon curing or setting, forms a flexible adhesive bond. Heat-reactable adhesives typical of those which can be satisfactorily employed for this purpose include polyurethane adhesives, vinyl adhesives, acrylic adhesives, phenolic adhesives, as well as natural and/or synthetic rubber-base adhesives including silicone adhesives, and the like. Of the foregoing adhesives, the use of polyurethane base additives have been found particularly satisfactory for adhesively securing pad materials of a polyurethane foam to supported vinyl face sheets. In accordance with the preferred practice of the present invention, the polyurethane adhesive in the form of a prepolymer is either roll coated or sprayed directly on one face of the pad, followed thereafter by the application of an overlying spray coating of an aqueous catalyst solution. When spray application of the polyurethane prepolymer is employed, it may be necessary to dilute the prepolymer with Freon or other suitable volatile solvents to reduce the viscosity thereof for achieving optimum spray patterns. The use of an aqueous catalyst solution which is applied over the polyurethane prepolymer is particularly advantageous since the application of the catalyst solution serves to simultaneously add the requisite water content to the pad material, which subsequently (during the molding operation) generates steam in a manner and for the purposes subsequently to be described. In those instances wherein the sheeting 26 is simultaneously adhered to the pad during the molding operation, both face surfaces of the pad are coated with the polyurethane adhesive and the aqueous catalyst solution. When employing adhesive systems devoid of any water, it is necessary to apply a coating of water either to one or both face surfaces of the pad in an amount sufficient to effect a generation of steam during the molding operation which penetrates through the padding material and applies a pressure to the inner surface of the face sheet, enhancing the depth of puff or quilting, as well as enhancing the heat transfer to the adhesive coatings, assuring a rapid heat curing thereof. When water is applied independently of the adhesive and catalyst system, it is usually preferred to employ a pad having the sheeting 26 preliminarily adhered to the rear surface thereof, in accordance with the structure as illustrated in FIG. 2, such that the requisite quantity of water can be applied directly to the face of the pad having the sheeting 26 thereon.

The quantity of water employed for effecting a generation of steam will vary, depending on such factors as the temperatures employed during the molding operation, the type of face sheet used (including the relative resiliency thereof and whether or not it is supported), the thickness or volume of the pad material used, the density of the pad material used, and the specific configuration of the puff or quitting to be formed in the composite structure. In essence, depending upon the foregoing variables, a quantity of water is employed so as to generate a quantity of steam sufficient to permeate the entire pad material, assuring heat transmission to the reactable adhesive layer disposed between the pad and face sheet, and to apply a sufficient pressure against the inner surface of the face sheet to assure a fullness and increased depth of the profile of the puff or quilting formed. The use of excessive quantities of water, effecting the generation of excessive quantities of steam, has in some instances resulted in the build up of great pressures which effected a bursting or rupture of the face sheet while in the mold. In view of the foregoing, the optimum quantity of water to be employed can be readily determined empirically for any given molding operation employing the sealed pad and facing materials. For example, in forming composite treatment materials employing supported vinyl face sheets and pad materials consisting of polyurethane foam of approximately ¼" thick, eminently satisfactory results have been attained when the quantity of water employed is in the range of from about 3 to about 6 ounces by weight per square yard. It will be apparent from the foregoing that it is desirable to distribute the water substantially uniformly over the pad material, to produce thereby a uniform generation of steam across the entire surface of the face sheet.

A typical decorative trim panel 28, produced in accord ance with the practice of the present invention, is illustrated in FIG. 3. As shown, the trim panel 28 is provided with a diamond-shaped puff or quilting on the face sheet thereof, as delineated by localized compressed lines indicated at 30, in which areas the intervening pad material is substantially completely compressed. It will be understood that alternative decorative designs can be readily incorporated on the face surface of similar trim panels, consistent with the intended end use thereof.

In accordance with an alternative embodiment in the method of making the composite trim panel, as subsequently to be described, it is now commercially feasible to provide selected surface texturing to the exterior face of the facing sheet of the trim panel. This selected variation in surface texturing can be seen in FIG. 3, wherein certain ones of diamond-shaped puffs are provided with a grained surface finish such as indicated at 32, whereas others of the diamond-shaped puffs are provided with a smooth glossy surface finish, and may additionally include supplementary surface embossments such as the small diamond indicated at 34. Accordingly, the resultant composite trim panel can be tailored to provide any desired aesthetic appearance to further enhance the attractiveness of the furniture or automotive trim assembly in which it is employed.

A typical die assembly is illustrated in FIG. 4, including a movable upper platen 36 and a stationary lower platen 38 to which an upper die 40 and lower die 42 are secured, respectively. The upper and lower dies 40, 42 may be suitably heated such as, for example, by electric resistant heaters 44 mounted on and extending inwardly into the body of each die. In the exemplary arrangement illustrated in FIG. 4, the lower die 42 is provided with a series of upstanding ribs or steel rules 46, as may be best seen in FIG. 5, which are disposed in a preselected pattern such as, for example, a diamond-shaped pattern, to provide a surface embossment as illustrated in FIG. 3. The height of the ribs 46, as shown in FIG. 5, is greater than the depth of puff of the composite trim material such that the uncompressed portions thereof are free to expand in accordance with the pressure of the steam generated within the pad material indicated at 48. The face sheet 50, as shown in FIG. 5, extends in a free arcuate profile from the edges of the upper ends of the ribs 46, providing excellent definition of the pattern imposed thereon and a smooth transition from the localized compressed lines, such as the lines 30 illustrated in the trim panel shown in FIG. 3. The pad 48 disposed between the ends of the ribs 46 and the upper die 40 is substantially completely compressed and is permeated with the adhesive composition such that, upon subsequent curing of the adhesive, resilient expansion of the localized compressed areas is prevented.

In accordance with a typical operating cycle, the pad and face sheet and sheeting material are positioned in appropriate registry and in superimposed relationship, forming an assembly indicated at 52 in FIG. 4, the intervening surfaces of which have been previously provided with a coating of the heat-reactable adhesive in a manner as previously set forth. Thereafter, the upper platen 36 is lowered, effecting a compression of the composite assembly in a configuration as illustrated in FIG. 5, and the die halves are retained in a closed position for a period of time to effect at least a partial curing of the adhesive to an extent sufficient to retain the deformed sheet in its contoured condition. The specific temperatures employed and the duration of the cure cycle will vary, depending on the nature of the adhesive employed, the thickness of the pad, the quantity of water employed, and the heat-softening point of the thermoplastic resin of which the face sheet is comprised. As a typical example, when employing a low-density polyurethane foam pad and a supported vinyl face sheet between which is a layer of a polyurethane base adhesive is applied, molding periods of between about 15 seconds up to about one minute (and usually about 30 seconds) are required to effect sufficient curing of the adhesive to provide shape retention. With the foregoing materials, the upper die 40 is usually heated to a temperature of from about 250° F. up to about 400° F., to assure a rapid vaporization of the water and the generation of steam which permeates the porous pad. The lower contoured die 42 need not be heated, since satisfactory trim panels can be made with the lower die at about room temperature. Generally, however, faster cure cycles are achieved when the lower contoured die is also heated up to a temperature below that at which heat softening of the thermoplastic facing sheet occurs, which for supported vinyl face sheets is usually less than about 250° F. The use of excessive temperatures of the lower contoured die has been found to result in an excessive heat softening of the thermoplastic sheet with a resultant excessive flow of the plastic at the localized compressed areas, which in some instances effects an exposure of the underlying supporting fabric. At the completion of a preselected cure period, the die assembly is opened and the appropriately contoured trim panel is removed and allowed to cool. During subsequent cooling and aging of the trim panel, a completion of the cure of the heat-reactable adhesive occurs, if in fact a complete cure was not achieved during the molding operation.

In accordance with an alternative embodiment of the present invention, a die assembly 54, as shown in FIG. 6, can be employed consisting of a movable upper platen 56 and a stationary lower platen 58 having mounted thereon an upper die 60 and a lower die 62, respectively. The die assembly 54, as shown in FIG. 6, is similar to that previously described in connection with FIG. 4, but differs therefrom in that the lower die 62 is constructed for vacuum molding to further supplement the internal steam pressure applied to the face sheet during the molding operation. The upper die 60 and lower die 62 similarly can be heated by means well known in the art, such as electric resistant heaters 64 mounted on and extending inwardly of the dies to maintain them at an appropriate preselected temperature. In accordance with a preferred embodiment of the die assembly 54, the lower die 62 (as may be best seen in FIG. 7) consists of a steel frame 66 within which a porous contoured metallic matrix 68 is mounted and is spaced from the base thereof, forming a cavity 70 in communication with the inner surface thereof. The cavity 70, as may be best seen in FIG. 6, is adapted to be connected to a suitable source of vacuum 72 by means of a conduit 74 which conventionally can be automatically actuated at the completion of the closure of the die assembly.

The contoured porous matrix 68, as best seen in FIG. 7, is formed with a plurality of cavities indicated at 76 which conform with the specific configuration of the puffs or quilts to be applied to the composite trim material. Due to the greater pressure of contact between the face sheet indicated at 78 and the surface of the cavity 76, the specific texturing applied to the surface of the cavity is reproduced in the surface of the thermoplastic face sheet. Accordingly, selectively textured trim panels, such as the trim panel 28 illustrated in FIG. 3, can readily be obtained by simply providing the appropriate surface texture to select portions of the lower die.

It is preferred to preheat the vinyl facing sheet to an elevated temperature to effect a heat softening thereof prior to its placement between the upper and lower dies in order to achieve improved definition of the textured pattern imposed thereon during the molding operation. The lower die 62, which is provided with the textured surface thereon is preferably controlled in temperature from about room temperature (70° F.) up to about 150° F. and more usually from about 80° F. to about 180° F. The upper die 60 is heated to a preselected elevated temperature such as the temperatures previously described in connection with the molding operation shown in FIGURES 4 and 5 in order to effect a generation of steam and a heat activation and curing of the adhesive disposed between the several plies of the trim panel being formed. Particularly satisfactory results have been obtained by controlling the lower textured die 62 at a temperature of about 90° F. and preheating the vinyl facing sheet to a temperature of from about 300° F. to about 350° F. The resultant textured pattern obtained employing the foregoing conditions constitutes an exact permanent replica of the textured pattern formed on the porous matrix comprising the lower die 62.

In operation, the superimposed assembly indicated at 80 in FIGURE 6 including the vinyl facing sheet which has been preheated to an elevated temperature and the pad material, with the sheeting either preliminarily secured to or separate from the pad, is placed between and in registry with the upper and lower dies 60 and 62 as shown. The upper platen 56 is thereafter lowered, effecting a compression of the composite assembly in the configuration as illustrated in FIGURE 7. After complete closure of the die assembly, a vacuum is applied to the cavity 70, effecting intimate contact of the face sheet 78 with the surface of the cavities 76 of the lower die. Simultaneously, a heating of the upper surface of the pad as viewed in FIGURE 7 by the upper die 60, which is at an elevated temperature, effects the generation of steam which permeates through the pad 82 and imposes an increased positive pressure on the inner surface of the thermoplastic face sheet 78. The combined positive internal pressure and external pressure on the heat softened face sheet, assures intimate contact of the outer surface thereof with the cavity 76 and the lower die such that the exact replica of the surface texturing of the lower die is imparted to the surface of the face sheet. At the completion of a preselected dwell period, sufficient to assure at least a partial curing of the heat-reactable adhesive and a retention of the composite assembly in its compressed condition, the die assembly is opened and the resultant trim panel is removed and allowed to cool.

It will be apparent from the foregoing that the formation of the composite trim panel, in accordance with the two alternative techniques hereinbefore described, is equally applicable for the formation of trim panels incorporating a fabric face sheet such as the face sheet 16 illustrated in FIG. 2. In such case, however, surface texture of the fabric face sheet is generally impractical or impossible, and the technique as illustrated in FIGS. 4 and 5 is usually employed for such purpose.

While it will be apparent that the preferred embodiments of the invention disclosed are well calculated to fulfill the objects above stated, it will be appreciated that the invention is susceptible to modification, variation and change without departing from the spirit of the invention.

What is claimed is:

1. The method of making a composite decorative trim panel which comprises the steps of applying a coating of a heat reactable adhesive between the opposed surfaces of a face sheet and a resilient compressible pad, said face sheet comprising a woven fabric having a substantially impervious layer affixed to the inner surface thereof and coextensive therewith, said pad incorporating water on at least one surface thereof in an amount sufficient to generate steam and permeate said assembly on subsequent heating thereof when disposed between two die halves, superimposing said face sheet on said pad and positioning the composite assembly between said upper and lower die halves with said face sheet positioned adjacent to one of said dies having a preselected contour in the face thereof, closing said dies and effecting a concurrent localized compression of said composite assembly and a heating thereof at a temperature below that at which thermal degradation of said face sheet occurs and to effect conversion of said water into steam which permeates throughout said assembly and exerts a positive pressure against the internal surface of said face sheet in the uncompressed areas thereof, applying suction between the surface of said one of said dies and the exterior face of said face sheet to enhance intimate contact therebetween, maintaining said composite assembly compressed for a period of time sufficient to effect at least a partial curing of said adhesive and a penetration thereof through the localized compressed portions of said pad, and thereafter opening said die and removing the trim panel therefrom.

2. The method of making a composite decorative trim panel which comprises the steps of applying a coating of a heat reactable adhesive between the opposed surfaces of a substantially impermeable thermoplastic face sheet and a resilient compressible pad, said pad incorporating water on at least one surface thereof in an amount sufficient to generate steam and permeate said assembly on subsequent heating thereof when disposed between two die halves, superimposing said face sheet on said pad and positioning the composite assembly between said upper and lower die halves with said face sheet positioned adjacent to one of said dies having a preselected contour in the face thereof, closing said dies and effecting a concurrent localized compression of said composite assembly and a heating thereof at a temperature below that at which thermal degradation of said face sheet occurs and to effect conversion of said water into steam which permeates throughout said assembly and exerts a positive pressure against the internal surface of said face sheet in the uncompressed areas thereof, applying suction between the surface of said one of said dies and the exterior face of said face sheet to enhance intimate contact therebetween, maintaining said composite assembly compressed for a period of time sufficient to effect at least a partial curing of said adhesive and a penetration thereof through the localized compressed portions of said pad, and thereafter opening said die and removing the trim panel therefrom.

3. The method of making a composite decorative trim panel which comprises the steps of applying a coating of a heat reactable adhesive between the opposed surfaces of a substantially impermeable thermoplastic face sheet and a resilient compressible pad, said pad incorporating water on at least one surface thereof in an amount sufficient to generate steam and permeate said assembly on subsequent heating thereof when disposed between two die halves, superimposing said face sheet on said pad and positioning the composite assembly between said upper and lower die halves with said face sheet positioned adjacent to one of said dies having a preselected contour in the face thereof, said face of said one of said dies provided with selected variations in the texture thereof to impart a corresponding texture to the exterior surface of said face sheet, closing said dies and effecting a concurrent localized compression of said composite assembly and a heating thereof at a temperature below that at which thermal degradation of said face sheet occurs and to effect conversion of said water into steam which permeates throughout said assembly and exerts a positive pressure against the internal surface of said face sheet in the uncompressed areas thereof, applying suction between said face of said one of said dies and said exterior surface of said face sheet to enhance intimate contact therebetween, maintaining said composite assembly compressed for a period of time sufficient to effect a texturing of said face sheet and at least a partial curing of said adhesive and a penetration thereof through the localized compressed portions of said pad, and thereafter opening said die and removing the trim panel therefrom.

4. The method of making a composite decorative trim panel which comprises the steps of applying a coating of a heat reactable adhesive between the opposed surfaces of a substantially impermeable thermoplastic face sheet supported on its inner surface by a coextensive fibrous sheet and a resilient compressible pad, said pad incorporating water on at least one surface thereof in an amount sufficient to generate steam and permeate said assembly on subsequent heating thereof when disposed between two die halves, superimposing said face sheet on said pad and positioning the composite assembly between said upper and lower die halves with said face sheet positioned adjacent to one of said dies having a preselected contour in the face thereof, said face of said one of said dies provided with selected variations in the texture thereof to impart a corresponding texture to the exterior surface of said face sheet, closing said dies and effecting a concurrent localized compression of said composite assembly and a heating thereof at a temperature below that at which thermal degradation of said face sheet occurs and to effect conversion of said water into steam which permeates throughout said assembly and exerts a positive pressure against the internal surface of said face sheet in the uncompressed areas thereof, applying suction between said face of said one of said dies and said exterior surface of said face sheet to enhance intimate contact therebetween, maintaining said composite assembly compressed for a period of time sufficient to effect a texturing of said face sheet and at least a partial curing of said adhesive and a penetration thereof through the localized compressed portions of said pad, and thereafter opening said die and removing the trim panel therefrom.

References Cited

UNITED STATES PATENTS

| | | |
|---|---|---|
| 2,227,212 | 12/1940 | Beck. |
| 2,693,221 | 11/1954 | Lyijynen _____ 156—209 |
| 2,946,713 | 7/1960 | Dusina et al. _____ 156—219 |
| 3,256,131 | 6/1966 | Koch et al. _____ 161—119 |
| 3,320,108 | 5/1967 | Lande _____ 156—219 |

MORRIS SUSSMAN, *Primary Examiner.*

U.S. Cl. X.R.

156—209, 285; 161—89, 119, 121, 160